US011020786B2

(12) United States Patent
Golovashchenko

(10) Patent No.: US 11,020,786 B2
(45) Date of Patent: Jun. 1, 2021

(54) SYSTEM FOR CONTROLLING THE RESTRAINING FORCE APPLIED TO A PANEL DURING A DRAWING OPERATION

(71) Applicant: OAKLAND UNIVERSITY, Rochester, MI (US)

(72) Inventor: Sergey F. Golovashchenko, Beverly Hills, MI (US)

(73) Assignee: OAKLAND UNIVERSITY, Rochester, MI (US)

(*) Notice: Subject to any disclaimer, the term of this patent is extended or adjusted under 35 U.S.C. 154(b) by 303 days.

(21) Appl. No.: 16/139,953

(22) Filed: Sep. 24, 2018

(65) Prior Publication Data

US 2019/0091751 A1 Mar. 28, 2019

Related U.S. Application Data

(60) Provisional application No. 62/562,824, filed on Sep. 25, 2017.

(51) Int. Cl.
*B21D 24/10* (2006.01)
*B23Q 17/24* (2006.01)
(Continued)

(52) U.S. Cl.
CPC ............. *B21D 24/10* (2013.01); *B21D 22/22* (2013.01); *B23Q 17/005* (2013.01); *B23Q 17/2414* (2013.01)

(58) Field of Classification Search
CPC ........ B21D 22/22; B21D 24/00; B21D 24/04; B21D 24/10; B21D 24/06; B21D 24/08;
(Continued)

(56) References Cited

U.S. PATENT DOCUMENTS 4,745,792 A 5/1988 Story et al.
5,419,169 A * 5/1995 Kirii ................. G05B 19/40937
72/16.1
(Continued)

FOREIGN PATENT DOCUMENTS

DE 3735581 C1 * 5/1988 ............. B21D 22/26
DE 102012007995 A1 * 10/2013 ............. B21D 24/10

OTHER PUBLICATIONS

DE 37 35 581 C1 Machine Translation (Year: 1987).*
(Continued)

*Primary Examiner* — Adam J Eiseman
*Assistant Examiner* — Fred C Hammers
(74) *Attorney, Agent, or Firm* — Brooks Kushman P.C.

(57) ABSTRACT

A system and apparatus is disclosed for controlling a restraining force applied to a panel. The apparatus includes a die, a binder supporting the panel against the die, and a punch used to draw the panel into the die. A restraining element is disposed on one of the die and the binder that engages a surface of the panel and applies a restraining force onto the panel. A strain gauge is disposed inside at least one of the die and the binder that engages a surface of the panel to measure the restraining force applied to the panel. The level of restraining force applied by the restraining element onto the panel is controlled based upon the restraining force measured by the strain gauge.

17 Claims, 3 Drawing Sheets

(51) Int. Cl.
*B23Q 17/00* (2006.01)
*B21D 22/22* (2006.01)

(58) Field of Classification Search
CPC ........... B21D 24/12; B21D 24/14; G01L 1/22; G01L 1/2206
See application file for complete search history.

(56) References Cited

U.S. PATENT DOCUMENTS

| | | | | |
|---|---|---|---|---|
| 5,450,756 | A * | 9/1995 | Kirii | B21D 24/08 73/825 |
| 5,901,599 | A * | 5/1999 | Sato | B21D 24/04 72/350 |
| 6,769,280 | B2 | 8/2004 | Cao et al. | |
| 10,160,021 | B2 * | 12/2018 | Kraft | B21D 22/20 |
| 2011/0132208 | A1 * | 6/2011 | Asakawa | B30B 15/26 100/35 |
| 2019/0084026 | A1 * | 3/2019 | Tsunekawa | B21D 24/10 |

OTHER PUBLICATIONS

DE 10 2012 007 995 MT (Year: 2012).*
W.J. Emblom and W.Neher, "Blankholder tooling design for sheet metal panel drawing", Journal of Machining and Forming Technologies, 2013, vol. 5, No. 1-2 pp. 1-15.
Klaus Siegert, M. Haussermann, Dirk Haller, Stefan Wagner, Michael Zeigler, "Tendencies in presses and dies for sheet metal forming processes", Journal of Materials Processing Technology 98 (2000) pp. 259-264.
Taylan Alton, Lars Penter, "Application of Modern Cushion Systems to Improve Quality and Productivity in Sheet Metal Forming" CIRP Conference on Process Machine Interactions—Vancouver, Canada Jun. 10-11, 2010.
C.W. Hsu, A.G. Ulsoy, M.Y. Demeri "Development of process control in sheet metal forming" Journal of Materials Processing Technology vol. 127, 2002, pp. 361-368.
Neil Krishnan and J Cao, "Estimation of Optimal Blank Holder Force Trajectories in Segmented Binders Using an ARMA Model" Journal of Manufacturing Science and Engineering 2003, vol. 125, pp. 763-770.
K. Siegert, E. Dannenmann, S. Wagner, A. Galaiko, "Closed-Loop Control System for Blank Holder Forces in Deep Drawing" Annals of the CIRP vol. 44/1/1995, pp. 251-254.
Soren Tommerup, Benny Endelt "Experimental verification of a deep drawing tool system for adaptive blank holder pressure distribution" Journal of Materials Processing Technology 212 (2012) pp. 2529-2540.
Y.R. Seo, "Electromagnetic blank restrainer in sheet metal forming processes" International Journal of Mechnal Sciences, vol. 50 (2008), pp. 743-751.
De'an Meng, Shengdun Zhao, Lei Li, Chen Liu, "A servo-motor driven active blank holder control system for deep drawing process", International Journey of Advanced Manufacturing Technology (2016) 87: 3185-3193.
Yongseob Lim, Ravinder Venugopal, A. Galip Ulsoy, "Advances in the Control of Sheet Metal Forming", Proceedings of the 17th World Congress, The International Federation of Automatic Control, Seoul, Korea, Jul. 6-11, 2008, pp. 1875-1883.
William J. Emblom, Klaus J. Weinmann, "Improved Robustness through Closed-Loop Control for Aluminum Sheet Metal Stamp Forming", IMECE2008-67025 Proceedings of IMCE2008 2008 ASME International Mechanical Engineering Congress and Exposition Oct. 31-Nov. 6, 2008 Boston, Massachusetts, USA pp. 1-9.
Michael L. Bohn, Stefan U. Jurthe, and Klaus J. Weinmann, "A New Multi-point Active Drawbead Forming Die: Model Development for Process Optimization", International Congress and Exposition Detroit, Michigan Feb. 23-26, 1998 Reprinted from: Developments in Sheet Metal Stamping (SP-1322) pp. 1-8.
Klaus J. Weinmann, Stephen K. Kernosky, "Friction Studies in Sheet Metal Forming Based on a Unique Die Shoulder Force Transducer", Annals of the CIRP, vol. 45/1/1996, pp. 269-272.
William J. Emblom, Klaus J. Weinmann, "A Control Strategy for Intelligent Stamp Forming Tooling", Journal of Manufacturing Science and Engineering Dec. 2011, vol. 133 pp. 061026-1 through 061026-9.

* cited by examiner

SYSTEM FOR CONTROLLING THE RESTRAINING FORCE APPLIED TO A PANEL DURING A DRAWING OPERATION

REFERENCE TO RELATED APPLICATIONS

This application claims the benefit of U.S. provisional application Ser. No. 62/562,824 filed Sep. 25, 2017, the disclosure of which is hereby incorporated in its entirety by reference herein.

TECHNICAL FIELD

This disclosure relates to a system that monitors the restraining force applied to a sheet metal panel when drawn in a draw die and dynamically controls the level of restraining force applied based upon strain gauge measurements.

BACKGROUND

Sheet metal drawing operations are critical to manufacturing sheet metal components. A typical sheet metal forming die includes three major parts: a die, a punch and a binder. The function of the binder is to provide sheet metal inflow into the die cavity without wrinkling while the blank is drawn into its final shape between the punch and the die. Conventional binders are fabricated as a thick rigid plate with a machined shape offset from a flange area of the die. A typical offset value is about 110% of the thickness of stamped sheet metal (about 10% clearance) to allow material inflow and prevent substantial wrinkling.

The force applied by the binder is normally applied through several cylinders transmitting forces from the moving ram of the press to the binder or is applied based upon the cushion system of the press. The location of several hydraulic cylinders of a binder is analyzed to optimize the restraining force applied by a draw bead of a binder in a drawing operation to avoid wrinkling. In another approach, the concept of providing a flexible binder is proposed to distribute restraining forces with the binder. The flexible binder concept is a complex structure having reinforcing ribs that apply frictional force from the cylinders through the flexible binder to the flange of the blank. In a further development, a pin cushion approach was proposed to distribute forces to the flange of the sheet metal blank. The pin cushions were part of the press and the pins are subject to wear and degradation of the surface causing the contact surface to be roughened which increases the frictional force applied to the blank.

A sensor has been proposed for monitoring the actual sheet material in-flow into the die cavity by measuring displacement using a spring-loaded plunger that physically contacts one surface of a sheet metal panel. Oil, slivers, and other contaminants make this approach unreliable.

In another approach, an electromagnetic sensor may be used to measure material in-flow that includes several coils disposed in a signal coupling relationship. During the forming process, a signal applied to a first coil on the binder or die induces a signal in a second coil on the other of the die or binder, producing a response signal that varies linearly as a function of the location of the sensor relative to the sheet metal blank, as the sheet metal blank is drawn into the deformation zone. A problem with this approach is that the coil must be insulated from the metal binder ring or the die that contacts the binder flange. When the blank is drawn into the die, the coil insulation is subject to wear and contaminants on the surface of the blank damage the insulation. Metal particles on the surface of the blank also may cause interference making this approach unreliable.

The actuators applying forces to the binder are generally hydraulic cylinders. One approach to sensing binder restraining force distribution is based upon electromagnetic forces applying electromagnetic pressure on the sheet metal blank and creating friction with the flange of the die. The electromagnetic approach requires space for positioning multiple coils, and the actuator is limited to mild steel applications due to limitations of the maximum values of applied forces.

This disclosure is directed to solving the above problems and other problems as summarized below.

SUMMARY

The above approaches are complex and failed to provide a way to use restraining force data and panel in flow data to efficiently control the restraining force applied by the binder to a sheet metal panel to avoid wrinkles and splits in a drawing operation. Process control methodology was developed to adjust the restraining force applied by the binder and optimize material inflow into the die cavity for U-channel shape and a rectangular pan. The binder was subdivided into several segments and restraining forces were applied through each individual segment. Numerical simulation is used as a tool to design the binder and balance force distribution during a draw operation.

According to one aspect of this disclosure, a system is disclosed for controlling a restraining force applied to a panel. The system comprises a die, a binder supporting the panel against the die, and a punch that is used to draw the panel into the die. A restraining element is disposed on either the die or the binder that engages a surface of the panel and applies a restraining force onto the panel. A strain gauge measures the restraining force applied to a local area of one side of the panel. The restraining force applied by the restraining element onto the panel is controlled based upon the restraining force measured by the strain gauge.

According to other aspects of this disclosure, the restraining element may be a draw bead that is moved relative to the panel to change the restraining force applied to the panel. A die cushion pin controlled by a computer numerical control system may be used to move the restraining element relative to the panel.

A laser displacement measuring system may be fixed relative to the binder and directed toward an edge of the panel to measure the displacement of the edge of the panel during the drawing operation. Data relating to the displacement of the edge of the panel may be correlated to the measured restraining force.

The restraining element may be a draw bead that protrudes from the binder in a first direction and is moved relative to the panel to change the restraining force applied to the panel. The strain gauge may be disposed proximate a distal end of the draw bead. A second strain gauge measures the restraining force applied to the panel at a second local area on a second side of the panel. The second strain gauge may be used to measure the restraining force applied to the panel and may be disposed proximate a second surface of the panel. The second strain gauge may be disposed within the die proximate the second surface of the panel. The system may further comprise a third strain gauge that is attached adjacent to the die entry radius. A slot may be defined in the die between the second strain gauge and the third strain gauge to disassociate the strain measured by the second and third strain gauges.

Alternatively, the restraining element may be a pressure pin that is moved relative to the panel toward a wear plate disposed on an opposite side of the panel from the pressure pin. The pin is moved to change the restraining force applied to the panel by the pressure pin and the wear plate. The strain gauge may be assembled into the die proximate a distal end of the pressure pin that contacts the panel. Alternatively, the strain gauge may be attached to the wear plate that contacts the panel.

The system may further comprise a controller adapted to receive a measured strain signal from one or more strain gauges indicative of the restraining force applied to the panel. The controller may be adapted to provide a control signal to an actuator to move the restraining element toward or away from the panel.

The system may further comprise a laser displacement measuring system fixed relative to the binder that is directed toward an edge of the panel to measure the displacement of the edge of the panel during the drawing operation. The laser displacement measuring system is adapted to provide an edge displacement signal to the controller that correlates the strain signal with the edge displacement signal in conjunction with providing the control signal to the actuator.

According to another aspect of this disclosure, a method is disclosed for controlling a restraining force applied to a panel in a draw die including a die, a binder holding the panel against the die, and a punch that draws the panel into the die. The method comprises applying a restraining force to a surface of the panel with a restraining element disposed on one of the die and the binder. The restraining force applied to the panel is measured with a strain gauge disposed on either the die or the binder. The restraining force measured by the strain gauge is used to control the restraining force applied by the restraining element by moving the restraining element relative to the panel.

According to other aspects of this disclosure relating to the method, the step of measuring the restraining force applied to the panel may be performed by a strain gauge assembled within a movable draw bead that is moved by the actuator. Alternatively, the step of measuring the restraining force may be performed by at least one strain gauge provided in the die at a flange of the die that is on the opposite side of the panel from the binder.

The method may further comprise directing a laser displacement measurement apparatus toward an outer edge of the panel that measures the displacement of the edge of the panel during a draw operation. The laser displacement apparatus may provide a displacement signal to a controller, and the strain gauge may provide a strain signal to the controller that correlates the strain signal to the displacement signal to control the actuator.

The strain gauge may be one of a plurality of strain gauges that each function to measure the restraining force applied to different local areas of the panel. The plurality of strain gauges may be disposed on both the die and the binder.

According to another aspect of this disclosure, a draw die set is disclosed that comprises a die, a binder supporting the panel against the die, the binder including a plurality of segments that are aligned about the perimeter of a cavity defined by the die, and a punch adapted to draw the panel into the die. Restraining elements are assembled to the segments of the binder to engage a surface of the panel. The restraining elements apply a restraining force onto the panel. Strain gauges are each disposed within one of the plurality of segments of the binder engaging a surface of the panel to measure the restraining force applied to the panel. The restraining force is controlled based upon the restraining force measured by the strain gauges.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
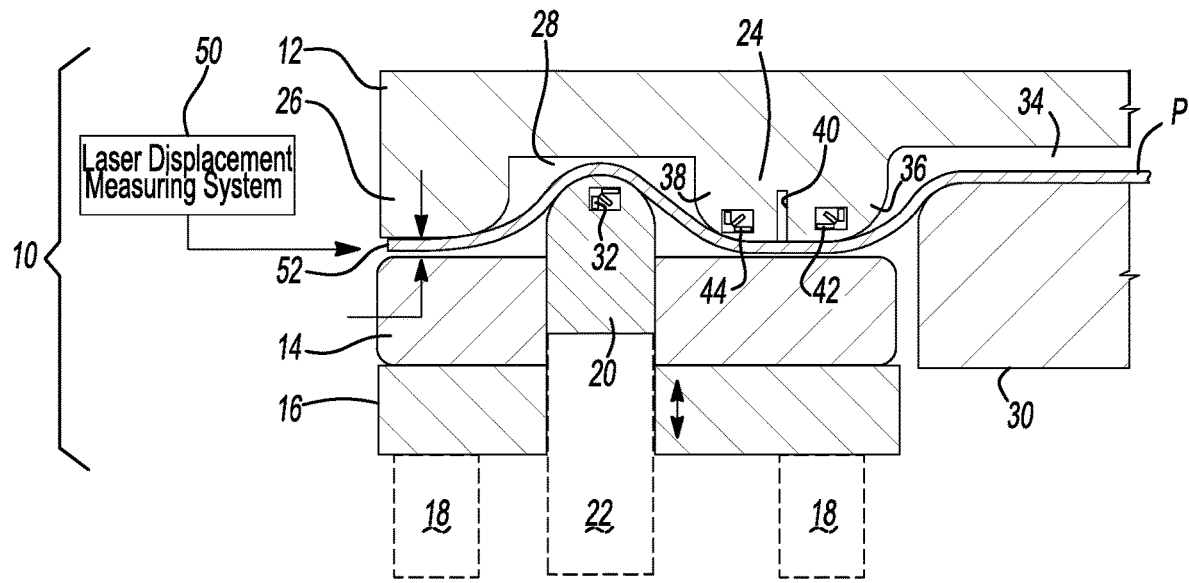
FIG. 1 is a fragmentary cross-sectional view of a draw die set including a die, a binder and a punch having a plurality of strain gauges for measuring the restraining force in several local areas of a blank.

Referring to FIG. 1, a draw die set is generally indicated by reference numeral 10 that is used to draw a panel P to a desired shape. The draw die set 10 includes a die 12 which in the illustrated embodiment is an upper die but may alternatively be a lower die depending upon the type of draw press (not shown) with which the die set 10 is design to be utilized. A plurality of binder ring segments 14 are assembled to a binder support ring 16. The binder ring segments 14 are provided to facilitate servicing and adjusting the draw die set 10 because they may be removed independently of the other binder ring segments 14 and repaired or replaced. In the illustrated embodiment, the binder ring segments 14 are supported on the binder support ring 16 which is below the panel P.

A binder ring cushion cylinder 18 supports the binder support ring 16 and moves the binder support ring 16 and binder ring segments relative to the die 12 to maintain a clearance of approximately 10% of the thickness of the panel P. The binder ring cushion cylinder 18 also facilitates loading the panel P into the die set and unloading the panel P from the die set.

A movable draw bead 20, or male draw bead, protrudes above the binder ring segments 14 and is adapted to be moved toward or away from the panel P to increase or decrease the restraining force provided by the movable draw bead 20. Each of the binder ring segments may include a movable draw bead or only select binder ring segments may be provided with a movable draw bead. Other binder ring segments may be provided with conventional stationary draw beads (not shown).

The movable draw bead 20 is moved by a draw bead cushion pin 22 to increase or decrease the restraining force provided by the movable draw bead 20. The draw bead cushion pin 22 may be actuated hydraulically, pneumatically or by an electric drive such as a servo motor. Actuation of the draw bead cushion pin 22 is controlled by a controller as will be described below.

Figure 2:
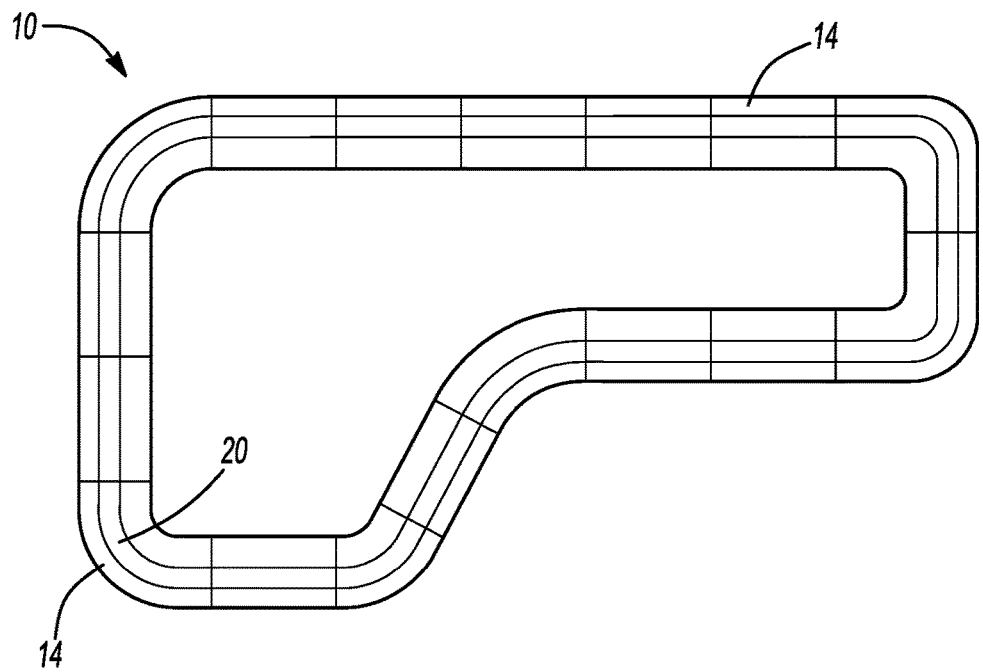
FIG. 2 is a diagrammatic top plan view of a segmented binder for a draw press having a plurality of movable draw beads.

Referring to FIG. 2, a diagrammatic plan view of one example of a die set 10 including a plurality of binder ring segments and a plurality of movable draw beads 20 is provided. The movable draw beads 20 span the segments except for the area adjacent adjoining segments.

With continued reference to FIG. 1, a static draw bead 24, or female draw bead, may be provided on a surface of the die 12 that engages the panel P and is disposed inboard relative the movable draw bead. In the illustrated embodiment, the binder ring segments 14 engage the lower surface of the panel P while the static draw bead engages the opposite side of the panel P.

An outer periphery portion 26 of the die 12 is disposed outboard relative to the movable draw beads 20. The outer periphery portion 26 and inner perimeter ridge 24 together define a draw bead clearance groove 28. The movable draw bead 20 is received in the draw bead clearance groove 28. As the panel P is drawn into the draw die set 10, it is pulled by a punch 30 of the die set 10 between the die 12 and the binder ring segments 14 and across the movable draw bead 20 that exerts a restraining force on the panel P. The level of restraining force is increased when the movable draw bead is caused to protrude further into the draw bead clearance groove 28. Conversely, the level of restraining force is reduced when the movable draw bead is caused to protrude to a lesser extent into the draw bead clearance groove 28.

A movable draw bead strain gauge 32 is assembled into the movable draw bead 20 proximate but below the distal end of the movable draw bead 20. The movable draw bead strain gauge 32 measures the strain applied to the distal end of the movable draw bead 20 by the panel P, as the punch 30 draws the panel P into the die cavity 34. The movable draw bead strain gauge 32 creates a signal representative of the strain in the draw bead resulting from the restraining force applied to the blank. The signal is sent to a controller (shown in FIG. 5). The controller may correlate the strain signal from the movable draw bead 20 to control the restraining force to be applied by the movable draw bead 20.

The inner perimeter ridge 24 includes a die entry radius portion 36 and an intermediate radius portion 38. Portions of the panel P after being pulled over the movable draw bead 20 are pulled next across the intermediate radius portion 38 and then across the die entry radius portion 36. A slot 40 is defined between intermediate radius portion 38 and the die entry radius portion 36. A die entry strain gauge 42 is assembled into the die entry radius portion 36 and measures the strain applied to the die entry radius portion, as the punch 30 draws the panel P into the die cavity 34 and creates a signal representative of the strain at the die entry radius to the controller. An intermediate strain gauge 44 is assembled into the intermediate radius portion 38 and measures the strain applied to the intermediate radius portion 38 as the punch 30 draws the panel P into the die cavity 34 and creates a signal representative of the strain at the intermediate radius portion 38. The slot 40 allows for differentiation between the strain measurements at the intermediate radius portion 38 and the die entry radius portion 36.

The controller may correlate one or more of the strain signals from the movable draw bead 20, the intermediate radius portion 38 and the die entry radius portion 36 to control the restraining force to be applied by the movable draw bead 20.

A laser displacement measuring system 50 is attached to the draw die set 10 at a fixed location and is focused on an outer edge 52 of the panel P. As the punch 30 draws the panel P into the die cavity 34, the laser displacement measuring system 50 measures the displacement of the edge of the panel P and creates a signal indicative of the distance that the edge of the panel P moves over time that is provided to the controller. The controller may correlate the strain signals and signals from the laser displacement measuring system 50 to control the restraining force to be applied by the movable draw bead 20.

Figure 3:
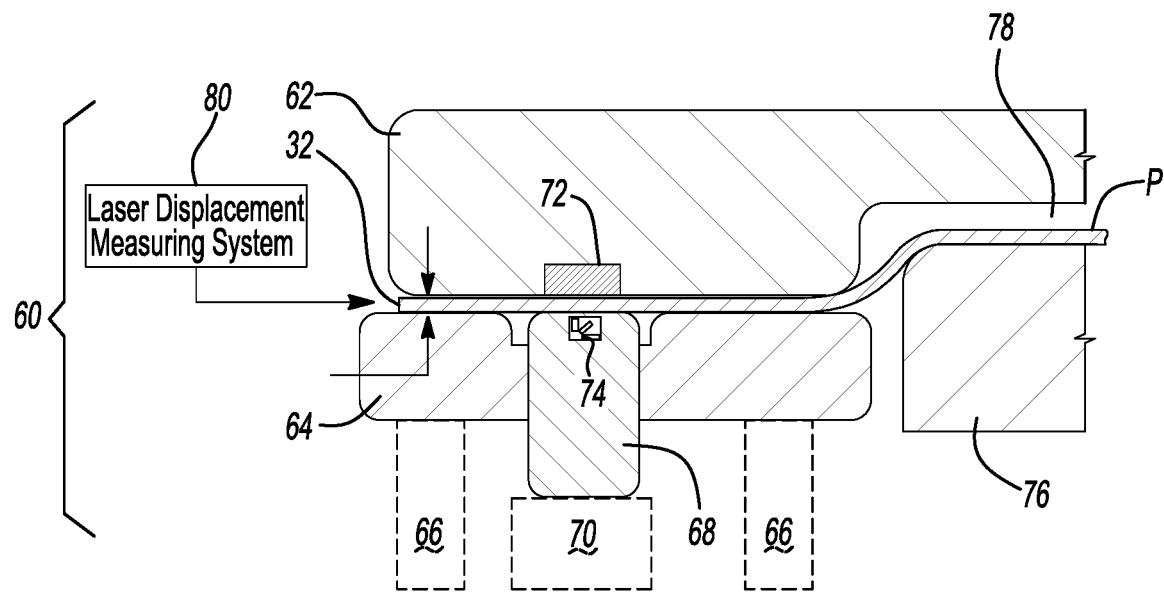
FIG. 3 is a fragmentary cross-sectional view of an alternative embodiment of a draw die set including a die, a punch, and a binder ring having at least one strain gauge for measuring the restraining force in at least one local area of a blank.

Referring to FIG. 3, an alternative embodiment of a draw die set is generally referred to by numeral 60. The draw die set 60 includes a die 62 and a binder ring 64. The binder ring 64 is supported on binder ring cushion cylinders in the illustrated embodiment that has the die 62 disposed above the binder ring 64. Alternatively, the upper die 62 may be a lower die and the binder ring may be disposed above the die depending upon the type of draw press (not shown) with which the draw die set 60 is design to be utilized.

A pressure pin 68 is supported on and movable relative to the panel P by a pressure pin cylinder 70. The pressure pin 68 engages a lower surface of the panel P and pinches the panel P against a wear plate 72. The pressure pin 68 is moved toward and away from the panel P to increase or decrease the frictional force applied to the panel P. One advantage of using the pressure pin 68 and wear plate 72 is that the size of the blank may be smaller to reduce material cost because a smaller binder flange is required compared to the embodiment of FIG. 1. A larger binder flange is required in the embodiment of FIG. 1 to provided sufficient metal to flow over the draw bead.

Figure 4:
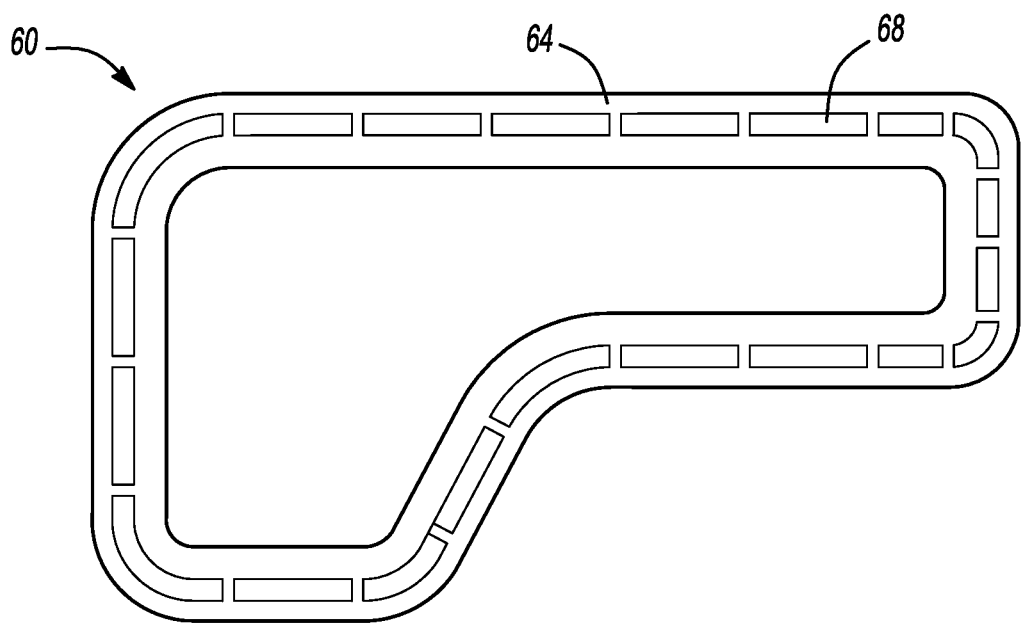
FIG. 4 is a diagrammatic top plan view of a continuous binder ring for a draw press having a plurality of pressure pins.

Referring to FIG. 4, a diagrammatic plan view of one example of a die set 60 including a continuous binder ring 64 and a plurality of pressure pins 68 is provided. The pressure pins 68 are closely spaced end-to-end around the binder ring 64. The pressure pins may be individually controlled by the controller to vary the frictional force applied to the panel P in different areas of the draw die set 60.

Referring back to FIG. 3, a pressure pin strain gauge 74 is assembled to the pressure pin 68 proximate the distal end of the pressure pin but below the surface of the pressure pin 68. As a punch 76 draws the panel P into the die cavity 78, the pressure pin strain gauge 74 creates a signal that is provided to the controller. The controller correlates the strain signal from the pressure pin strain gauge 74 to control the restraining force to be applied by the pressure pin 68.

A laser displacement measuring system 80 is attached to the die set 60 at a fixed location and is focused on an outer edge 82 of the panel P. As the punch 76 draws the panel P into the die cavity 78, the laser displacement measuring system 80 measures the displacement of the edge 82 of the panel P and creates a signal indicative of the distance that the edge of the panel P moves over time that is provided to the controller. The controller may correlate the strain signal from the pressure pin strain gauge 74 and signals from the laser displacement measuring system 80 to control the restraining force to be applied by the pressure pin 68.

Figure 5:
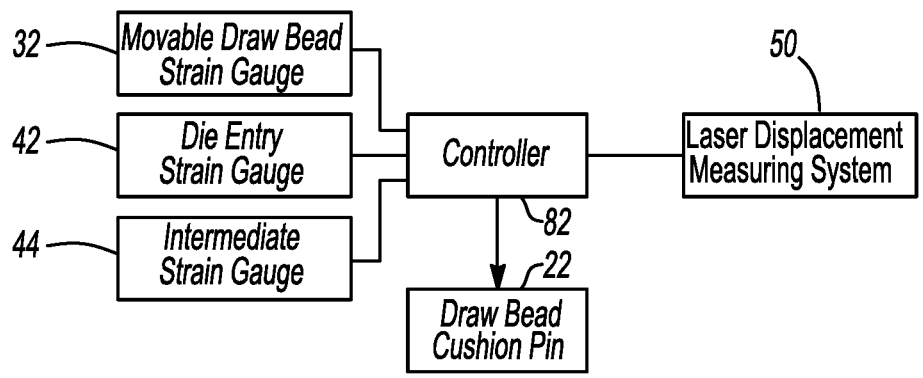
FIG. 5 is a flowchart that illustrates a control system for the embodiment of FIG. 1.

Referring to FIGS. 1 and 5, a control system flowchart is provided for the embodiment of the system for controlling a restraining force applied to a panel of FIG. 1. The movable draw bead strain gauge 32, provides a signal to a controller 82 that is representative of the strain measured at the distal end of the movable draw bead 20. The controller 82 may correlate only the strain signal from the movable draw bead strain gauge 32 to control the restraining force to be applied by the movable draw bead cushion pin 22.

Th obtain more precise control, the die entry strain gauge 42 and intermediate strain gauge 44 may provide signals representing the strain measured on the surface of the static draw bead to the controller 82. The controller 82 may correlate any one or any combination of the strain signals to control the restraining force to be applied by the movable draw bead cushion pin 22.

The laser displacement measurement system 50 may provide a signal representative of the displacement of the edge of the panel P over time as the panel P is drawn into the die cavity 34 by the punch 30. The signal from the laser displacement measurement system 50 may be correlated with one or more of the signals from the strain gauges to control the restraining force applied to the panel P.

Figure 6:
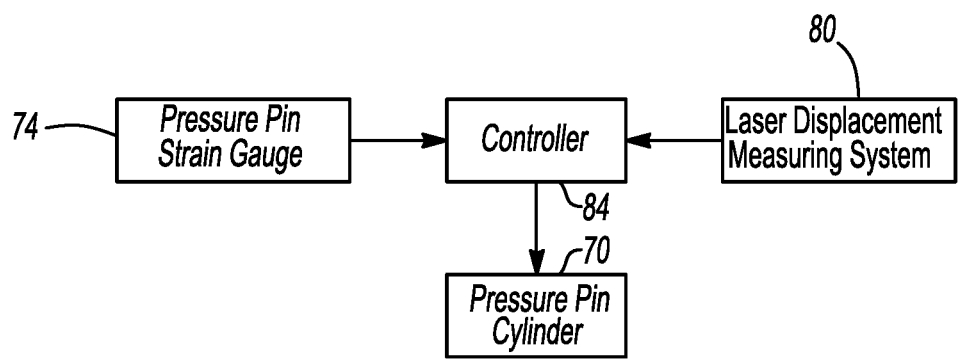
FIG. 6 is a flowchart that illustrates a control system for the embodiment of FIG. 3.

Referring to FIGS. 3 and 6, a control system flowchart is provided for the embodiment of the system for controlling a restraining force applied to a panel of FIG. 3. Pressure pin strain gauge 74 provides a signal representative of the strain measured on the surface of the pressure pin 68 (shown in FIG. 3) to the controller 84. The controller 84 may correlate only the strain signal from the pressure pin strain gauge 74 to control the restraining force to be applied by the pressure pin cylinder 70.

The laser displacement measurement system 80 may provide a signal representative of the displacement of the edge of the panel P over time as the panel P is drawn into the die cavity 78 by the punch 76. The signal from the laser displacement measurement system 80 may be correlated with the signal from the pressure pin strain gauge to control the restraining force applied to the panel P.

Additional strain gauges may be used in either the embodiment shown in FIG. 1 or 3, if desired. The system for controlling a restraining force applied to a panel may be included in all of the segments 64 or only selected segments in areas where problems relating to the drawing operation may be addressed. Likewise, the pressure pin strain gauges 74 may be included in one or more of the pressure pins 68 as needed for pressure control in local areas during the drawing operation.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A system for controlling a restraining force applied to a panel comprising:
    a die;
    a binder supporting the panel against the die;
    a punch drawing the panel into the die;
    a draw bead that is movable relative to the panel, the draw bead engages a surface of the panel, and applies a restraining force onto the panel;
    a strain gauge is disposed on the draw bead for measuring the restraining force applied to the panel; and
    a controller for adjusting the restraining force applied by the draw bead onto the panel based upon the restraining force measured by the strain gauge.

2. The system of claim 1 further comprising:
    a cushion pin controlled by the controller that moves the draw bead relative to the panel.

3. The system of claim 1 further comprising:
    a laser displacement measuring system fixed relative to the binder and directed toward an edge of the panel to measure displacement of the edge of the panel during a drawing operation.

4. The system of claim 1 wherein the draw bead is moved relative to the panel to change the restraining force applied to the panel.

5. The system of claim 4 wherein,
    a second strain gauge measures a second restraining force applied to a second surface of the panel.

6. The system of claim 5 wherein the second strain gauge measures the second restraining force at an inner perimeter ridge between the draw bead and a die entry radius of the die.

7. The system of claim 6 wherein,
    a third strain gauge measures a third restraining force at the inner perimeter ridge between the second strain gauge and the die entry radius.

8. The system of claim 7 wherein the inner perimeter ridge comprises a slot between the second strain gauge and the third strain gauge to disassociate strain measured by the second and third strain gauges.

9. The system of claim 1 wherein the draw bead is a pressure pin that is moved relative to the panel by a pressure pin cylinder, wherein a wear plate is disposed on an opposite side of the panel from the pressure pin, and wherein the pressure pin cylinder moves the pressure pin to change the restraining force applied to the panel by the pressure pin.

10. The system of claim 9 wherein the strain gauge is proximate a distal end of the pressure pin that contacts the panel.

11. The system of claim 9 wherein the strain gauge is assembled to the draw bead that is supported on the cushion pin that moves the pressure pin toward and away from the panel, and wherein the pressure pin pinches the panel against the wear plate.

12. The system of claim 9 further comprising:
    the controller adapted to receive a strain signal from the strain gauge indicative of the restraining force applied to the panel, wherein the controller for adjusting the restraining force applied by the draw bead onto the panel provides a control signal to an actuator that is adapted to move the pressure pin toward or away from the panel.

13. The system of claim 12 further comprising:
    a laser displacement measuring system to measure displacement of the edge of the panel during a drawing operation, fixed relative to the binder and directed toward an edge of the panel, wherein the laser displacement measuring system provides an edge displacement signal to the controller, and wherein the controller correlates the strain signal to the edge displacement signal in conjunction with providing the control signal to the actuator.

14. A method of controlling a restraining force applied to a panel in a draw die including a die, a binder supporting the panel against the die, and a punch that draws the panel into the die, the method comprising:
    applying the restraining force to a surface of the panel with at least one restraining element disposed on the binder;
    measuring the restraining force applied to the panel with at least one of a plurality of strain gauges that are each attached to at least one of the draw beads, wherein the step of measuring the restraining force applied to the panel is performed by the strain gauges that are attached to the at least one of the draw beads that each include a movable draw bead; and controlling an actuator operative to change the restraining force applied by the restraining element by moving the restraining element relative to the panel based upon the restraining force measured by the strain gauge.

15. The method of claim 14 wherein the at least one of a plurality of strain gauges each function to measure the restraining force applied to the panel, wherein the strain gauges are each attached to one of the restraining elements.

16. The method of claim 14 further comprising:
a laser displacement measurement apparatus that is directed to an outer edge of the panel that measures displacement of the outer edge of the panel during a draw operation and provides a displacement signal to a controller, wherein the one of a plurality of strain gauges provide a strain signal to the controller that correlates the strain signal to the displacement signal to control the actuator.

17. A draw die set comprising:

a die;

a binder supporting a panel against the die, the binder including a plurality of segments that are aligned about a perimeter of a cavity defined by the die;

a punch adapted to draw the panel into the die;

a plurality of draw beads each assembled to one of the segments of the binder, wherein the draw beads each engage a surface of the panel, and apply a restraining force onto the panel;

a plurality of strain gauges each being attached to the plurality of draw beads to measure the restraining force applied to the surface of the panel, wherein the segments of the binder each engage the surface of the panel a controller for controlling the restraining force applied by the movable restraining elements to the panel based upon the restraining force measured by the strain gauges, when the punch draws the panel into the die.

* * * * *